Patented May 22, 1951

2,553,772

UNITED STATES PATENT OFFICE 2,553,772

PARASITICIDAL COMPOSITIONS OF OLEFINS AND PERCHLOROMETHYL MERCAPTAN

Allen R. Kittleson, Cranford, and Howard L. Yowell, Westfield, N. J., assignors to Standard Oil Development Company, a corporation of Delaware No Drawing. Application October 21, 1948, Serial No. 55,835

8 Claims. (Cl. 167—22)

This invention relates to new and useful improvements in parasiticidal preparations and more particularly to improved fungicides and insecticides. This invention relates also to methods of protecting organic material subject to attack by low orders of organisms.

It has now been found that organic thio trichloromethanes, derived from the reaction of unsaturated organic compounds and perchloromethyl mercaptan and their derivatives, are extremely effective for destroying or checking the growth of bacteria, fungi and insects. These compounds may be used as novel ingredients of seed and plant protectants because of their disinfecting action on soil containing harmful organisms.

These compounds may also be applied to parent materials to retard or prevent fungus growth and mildew formation. Some of the parent materials to which they may be applied for protective purposes are leather, wood, fur, wool, coated fabrics and other substances.

These compounds which are in most cases liquid, may be applied as a dust mixed with a solid powder, such as clay, talc and bentonite. They may also be applied as a spray in a liquid carrier, either as a solution in a solvent, or as a suspension or emulsion in a non-solvent, such as water. When applied as a spray in water, it may be desirable to incorporate wetting agents and/or emulsifiers.

The water-soluble wetting agents and emulsifiers that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as ricinoleic acid ester of sorbitol and petroleum sulfonates of $C_{10}$ to $C_{20}$ length. The non-ionic emulsifying agents such as the ethylene oxide products of alkylated phenols may also be used. It is to be understood that these and similar compounds are intended when the term "wetting agent" is used hereafter.

By virtue of their solubility in the volatile "Freons" i. e., $CCl_3F$, $CCl_2F_2$, $CClF_3$, $CHCl_2F$, etc., and other aerosol type solvents together with its volatility characteristics, the compounds of this invention are adapted for use in aerosol compositions for space spray and fumigation applications. When put up in this form they can be dispensed in the conventional pressure containers known in the art. They can be of course be volatilized by application of heat in the area to be fumigated. The compounds of this invention, because of their volatility, are adapted for dispersion in other normally volatile solvents such as alcohols, ethers and hydrocarbons boiling below the initial boiling point of kerosene.

The compounds of this invention are readily compatible with other insecticidal and fungicidal mixtures and possesses a high degree of chemical stability in the atmosphere which makes them ideally suitable for use as agricultural spray residues. They may therefore be admixed with carriers that are themselves active such as other parasiticides, hormones, herbicides, fertilizers and stomach and contact insecticides such as the arsenates, fluorides, rotenone and the various fish poisons and organic insecticides such as di(p-) chlorophenyl-trichloroethane, benzene-hexachloride and similar products may also be advantageously added.

The thio trichloromethanes of this invention may be prepared by the association and condensation reactions of perchloromethyl mercaptan with an unsaturated compound such as, for example, alkenes, alkene derivatives, aromatic compounds and aromatic derivates. These reactions may be carried out with or without a catalyst and at varying temperatures depending upon the nature of the unsaturated reactant and the stability of the desired products. For most unsaturated compounds a reaction temperature of 80–120° C. is preferable.

The unsaturated compounds used in this reaction may be primary, secondary or tertiary. They may be attached to organic groups containing a variety of substituents such as ethers, acids, halides, esters, aromatic nuclei which in turn may be substituted, cyclic aliphatic groups and the like.

The general reaction may be written as follows:

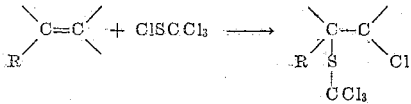

Equation I

It should be borne in mind, that while the formulae for particular compounds indicated below represent the best available information as to the structure of the major compound formed by the reactions indicated, the addition of the Cl and SCCl₃ components of perchloromethyl mercaptan to the unsaturated compounds also proceeds to some extent in the manner indicated in Equation II below, as compared to Equation I above, and the reaction product may therefore be a mixture of isomers.

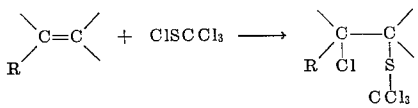

Equation II

The examples given below of the parasiticidal activity of the compounds of this invention are therefore expressed in terms of the products of the particular reactants.

The following examples are given to illustrate this invention and include both the preparation of these compounds and test results obtained by their uses for the stated purpose.

EXAMPLE I

*Reaction of perchloromethyl mercaptan with octene-1*

123 g. (1.1 mols) of octene-1 and 186 g. (1 mol) of perchloromethyl mercaptan were charged to a 500 cc. Erlenmeyer flask and heated on the steam bath to 90–95° C. for 24 hours. The reaction mixture was then distilled under reduced pressure from a Claisen distilling flask with the following results:

| Fraction | Distillation Temperature | Pressure (ads.) | Weight Recovered |
|---|---|---|---|
|  |  | Mm. | Grams |
| F I | Up to 115° C | 4 | 107 |
| F II | 115–125° C | 2–4 | 182 |
| F III | Residue |  | 13 |

F I consisted primary of unreacted perchloromethyl mercaptan and octene-1. The major portion of F II distilled over at 119–121° C. at 2 mm. pressure. The analysis of F II is as follows:

|  | Per Cent C | Per Cent H | Per Cent S | Per Cent Cl |
|---|---|---|---|---|
| Found F II | 36.47 | 5.29 | 11.08 | 48.11 |
| Theory for— |  |  |  |  |
| $C_6H_{13}\underset{\underset{CCl_3}{S}}{\overset{H}{C}}-CH_2Cl$ | 36.24 | 5.37 | 10.74 | 47.65 |

EXAMPLE II

*Reaction of perchloromethyl mercaptan with butadiene dimer (vinyl cyclohexene)*

108 g. of butadiene dimer (vinyl cyclohexene) and 372 g. of perchloromethyl mercaptan were mixed and heated to 92–99° C. for 18 hours. The reaction mixture was then charged to a Claisen distilling flask and an attempt made to distill the product. 110 g. distilled over below 100° C. at 2 mm. pressure but on heating to a pot temperature of 170° C. evidence of slight decomposition was noted and the distillation was discontinued. The residue consisted of 349 g. of a reddish viscous oil having a faint sharp odor.

Analysis of the product is given below:

|  | Per Cent C | Per Cent H | Per Cent Cl | Per Cent S |
|---|---|---|---|---|
| Residue | 31.54 | 3.58 | 53.55 | 12.78 |
| Theory for— $\underset{\underset{CCl_3}{S}}{\overset{H}{C}}-CH_2Cl$ on cyclohexene ring | 36.73 | 3.99 | 48.30 | 10.88 |
| Theory for— di-substituted cyclohexene | 25.00 | 2.51 | 59.16 | 13.33 |

It is apparent from the amount of high boiling residue recovered and the analysis of the residue that the product consists of a mixture of mono and di-substituted vinyl cyclohexene.

EXAMPLE III

*Reaction of perchloromethyl mercaptan with diisobutylene*

112 g. of diisobutylene and 186 g. of perchloromethyl mercaptan were mixed and heated to 95–99° C. for 24 hours. On distillation it was found that very little reaction had taken place. The mixture was again heated to the same temperature for an additional 42 hours. On distillation from a Claisen flask the following fractions were obtained:

| Fraction | Boiling Range | Weight Recovered |
|---|---|---|
| F I | below 80° C. @ 180 mm | 89 g. (diisobutylene). |
| F II | 80° C. @ 180 mm. to 72° C. @ 10 mm. | 120 g. (mostly perchloro methyl mercaptan). |
| F III | 72° C. @ 10 mm. to 88° C. @ 2 mm. | 9 g. |
| F IV | 88–98 C. @ 2 mm | 19 g. |
| F V | Residue | 10 g. |

Analysis of fractions IV and V gave the following results:

|  | Per Cent C | Per Cent H | Per Cent S | Per Cent Cl |
|---|---|---|---|---|
| F IV | 23.40 | 2.55 | 17.16 | 60.74 |
| F V | 36.10 | 5.28 | 12.42 | 47.92 |
| Theory for— $CH_3-\underset{CH_3}{\overset{CH_3}{C}}-CH_2-\underset{\underset{CCl_3}{S}}{\overset{CH_3}{C}}-CH_2Cl$  F V | 36.24 | 5.37 | 10.74 | 47.65 |
| Theory for— $CH_3-\underset{CH_2Cl}{\overset{CH_3}{C}}-SCCl_3$  F IV | 24.80 | 3.08 | 13.17 | 57.61 |

From the analysis it appears that F IV is largely the addition product of perchloromethyl mercaptan and isobutylene whereas F V is the addition product with diisobutylene.

EXAMPLE IV

*Reaction of perchloromethyl mercaptan with allyl ether*

A mixture consisting of 50 g. of allyl ether and 186 g. of perchloromethyl mercaptan after heating to 92–96° C. for 22 hours gave the following results on distillation:

| Fraction | Boiling Range | Weight Recovered |
|---|---|---|
|  |  | Grams |
| F I | Up to 109° C. @ 2 mm | 71 |
| F II | 109–115 @ 2 mm | 74 |
| F III | 115–127 @ 2 mm | 12 |
| F IV | Residue | 68 |

Analysis of fractions II and IV gave the following results:

|  | Per Cent C | Per Cent H | Per Cent Cl | Per Cent S |
|---|---|---|---|---|
| F II | 30.45 | 3.66 | 54.05 | 11.27 |
| F IV | 24.53 | 3.56 | 55.41 | 14.07 |
| Theory for— |  |  |  |  |
| $CH_2=CH-CH_2OCH_2CH(SCCl_3)-CH_2Cl$ | 30.66 | 3.65 | 51.90 | 11.67 |
| Theory for— |  |  |  |  |
| $ClCH_2CH(SCCl_3)CH_2OCH_2CH(SCCl_3)CH_2Cl$ | 20.45 | 2.13 | 60.42 | 13.62 |

The analysis indicates that F II consists chiefly of the mono addition product whereas F IV is a mixture of the mono and di addition compounds.

EXAMPLE V

*Reaction of perchloromethyl mercaptan with allyl acetate*

A mixture of 50 g. of allyl acetate and 93 g. of perchloromethyl mercaptan after heating at 92–95° C. for 44 hours was distilled giving 46 g. of a colorless oil distilling over at 110–117° C. @ 3 mm. pressure.

Analysis of this fraction gave the following results:

|  | Per Cent C | Per Cent H | Per Cent Cl | Per Cent S |
|---|---|---|---|---|
| Found | 25.19 | 2.89 | 50.12 | 12.50 |
| Theory for— |  |  |  |  |
| $CH_3C(=O)-OCH_2CH(SCCl_3)CH_2Cl$ | 25.17 | 2.80 | 49.65 | 11.20 |

EXAMPLE VI

The results of laboratory insecticide and fungicide tests on these compounds are given in the table below. The values given under immersion test represent the mortality of the test insect after 96 hours following a 2 minute immersion in an 0.25% aqueous dispersion of the test compound. The results of the injection test are given as per cent mortality 96 hours following injection of 0.5 mg. of the test compound per gram of insect body weight. The slide germination technique for fungicidal testing was carried out as described by Wellman and McCallan (Contributions of Boyce Thompson Institute, vol. 13, No. 3, pages 171–176). The results are reported as the minimum concentration, expressed as weight percent, giving 50% inhibition of spore germination.

| Compound, Reaction Product of perchloromethyl mercaptan and— | Insecticidal Data | | | | Fungicidal Data, Slide Germination | |
|---|---|---|---|---|---|---|
|  | Immersion Test | | Injection Test, *Periplanitus Americana* (American Roach) | |  |  |
|  | *Blattella germanica* (German) Roach | *Omelpeltus socintus* (Milkweed) Bug | Male | Female | *Alternaria solani* | *Sclerotinia fructicola* |
| Octene-1 | 100 | 100 | 40 | 40 | 0.01 –0.001 | 0.01 –0.001 |
| Tetradecene-1 | 20 | 100 | 40 | 80 | 0.1 –0.01 | 0.1 –0.01 |
| Isobutylene | 100 | 100 | 80 | 100 | 0.001 –0.0001 | 0.001–0.0001 |
| Diisobutylene | 100 | 100 | 100 | 100 | 0.01 –0.001 | 0.001–0.0001 |
| Vinyl cyclohexene | 55 | 50 | 80 | 40 | 0.01 –0.001 | 0.01 –0.001 |
| Allyl ether (mono substituted) | 100 | 100 | 40 | 80 | 0.01 –0.001 | 0.01 –0.001 |
| Allyl ether (Disubstituted) | 30 | 100 | 60 | 80 | 0.01 –0.001 | 0.01 –0.001 |
| Allyl Acetate | 100 | 100 | 100 | 100 | 0.0001 | 0.01 –0.001 |
| Undecylenic Acid | 100 | 100 | 60 | 100 | 0.01 –0.001 | 0.01 –0.001 |

It is apparent that mixtures of the various compounds synthesized also possess the indicated parasiticidal activity.

This invention has been described with respect to specific embodiments but it is not to be limited thereby.

What is claimed is:

1. A parasiticidal dust composition comprising the reaction product of an unsaturated organic compound selected from the group consisting of aliphatic and alicyclic organic compounds and perchloromethyl mercaptan as the active ingredient admixed with a powdered clay.

2. A parasiticidal dust composition as in claim 1 in which the clay is bentonite.

3. A parasiticidal composition comprising the reaction product of an unsaturated organic compound selected from the group consisting of aliphatic and alicyclic organic compounds and perchloromethyl mercaptan as the active ingredient admixed with a solid, powdered, inert diluent.

4. A parasiticidal dust composition as in claim 1 in which the unsaturated organic compound is allyl acetate.

5. A parasiticidal dust composition as in claim 1 in which the unsaturated organic compound is undecylenic acid.

6. A parasiticidal dust composition as in claim 1 in which the unsaturated organic compound is allyl ether.

7. A parasiticidal dust composition as in claim 1 in which the unsaturated organic compound is diisobutylene.

8. A parasiticidal dust composition as in claim 1 in which the unsaturated organic compound is isobutylene.

ALLEN R. KITTLESON.
HOWARD L. YOWELL.

REFERENCES CITED

The following references are of record in the file of this patent:

UNITED STATES PATENTS

| Number | Name | Date |
| --- | --- | --- |
| 2,197,781 | Badertscher et al. | Apr. 23, 1940 |
| 2,319,183 | Badertscher et al. | May 11, 1943 |

OTHER REFERENCES

Roark et al.; U. S. D. A. Technical Bulletin No. 162, March 1929, entitled Tests of Various Aliphatic Compounds as Fumigants, page 33.